United States Patent [19]

Fischer et al.

[11] 4,039,459

[45] Aug. 2, 1977

[54] COMPOSITION AND METHOD FOR DRILLING A RESERVOIR CONTAINING A HIGH TEMPERATURE AQUEOUS LIQUID

[75] Inventors: Paul W. Fischer, Whittier; Horst E. Zilch, Yorba Linda, both of Calif.

[73] Assignee: Union Oil Company of California, Brea, Calif.

[21] Appl. No.: 701,366

[22] Filed: June 30, 1976

[51] Int. Cl.$^2$ .......................... C09K 7/02; C09K 7/08; C02B 5/06

[52] U.S. Cl. .................................. 252/8.5 C; 175/69; 175/71; 210/58; 252/180

[58] Field of Search ............ 252/8.5 A, 8.5 C, 8.55 B, 252/180; 210/58; 175/69, 71

[56] References Cited

U.S. PATENT DOCUMENTS

| | | | |
|---|---|---|---|
| 2,650,197 | 8/1953 | Rahn | 252/8.5 |
| 2,923,681 | 2/1960 | Hein et al. | 252/8.5 |
| 3,130,153 | 4/1964 | Keller | 252/8.55 |
| 3,313,362 | 4/1967 | Schneider | 252/8.5 X |
| 3,336,221 | 8/1967 | Ralston | 210/58 |
| 3,597,352 | 8/1971 | Stanford et al. | 252/8.55 |
| 3,749,554 | 7/1973 | Fischer et al. | 252/8.55 X |
| 3,958,635 | 5/1976 | Zilch et al. | 166/244 |

*Primary Examiner*—Herbert B. Guynn
*Attorney, Agent, or Firm*—Richard C. Hartman; Dean Sandford; Gerald L. Floyd

[57] ABSTRACT

A composition and method for drilling a well into a subterranean reservoir containing a high temperature aqueous liquid which composition contains as a scale inhibitor (i) a water-soluble substituted iminodi(methylene phosphonic acid) compound having a carbon-to-phosphorus bond or a water-soluble salt thereof, (ii) a dicarboxylic acid, (iii) a lower alkyl ester or hydroxy derivative of a dicarboxylic acid, (iv) hexamethylenetetramine, (v) thiourea, or (vi) the amide reaction product of a polycarboxylic acid and an aliphatic amine, an aliphatic hydroxyl amine, or a heterocyclic nitrogen-containing compound.

12 Claims, No Drawings

COMPOSITION AND METHOD FOR DRILLING A RESERVOIR CONTAINING A HIGH TEMPERATURE AQUEOUS LIQUID

BACKGROUND OF THE INVENTION drilling

1. Field of the Invention

This invention relates to a composition and method for preventing the deposition of scale in wells and well drilling equipment used to drill reservoirs containing high temperature aqueous liquids. More particularly the invention relates to such a composition and method for preventing the deposition of scale onto the sidewall of a well and onto metal surfaces from high temperature brines from oil and gas producing wells or geothermal fluids containing calcium or other scale-forming ions when such reservoir fluids contact the drilling fluid and are circulated through the well drilling equipment along with the drilling fluid.

2. Description of the Prior Art

Drilling wells into subterranean reservoirs containing hot aqueous fluids such as brine along with gas and oil or geothermal fluids presents many problems concerning the choice of a drilling fluid. Conventional aqueous base drilling fluid containing water, clay and various additives is generally used in drilling the first two to four thousand feet of hole through the usually somewhat incompetent strata above the reservoir containing high temperature fluids. Casing is cemented in place over this portion of the hole and drilling is continued using any one of a number of drilling fluids. Problems arise at lower depths when the drill bit penetrates those reservoirs containing a high temperature brine or a geothermal fluid, which reservoirs often lie several thousand feet below the surface. Such reservoirs are often highly porous and permeable. If conventional drilling fluid is used, the weight of the high gravity column of drilling fluid in the well is so great that a considerable amount of the fluid invades the reservoir. This necessitates use of a large additional volume of fluid and results in partial plugging of the reservoir by the clay and other solids in the fluid. When the well is subsequently completed, this plugging decreases the amount of formation fluid which can be produced via the well. If a relatively light-weight drilling fluid, such as air or another gas, is used, a high rate of circulation of the driling fluid through the system is required to circulate cuttings out of the hole. This high rate of circulation of the drilling fluid together with the fluids produced from the reservoir, result in corrosion and erosion problems. The high velocity gaseous fluids erode the unconsolidated portions of the reservoir to such an extent that hole stability cannot be achieved. In many cases, even the drill pipe is eroded.

One solution to these problems has been to drill reservoirs containing a high temperature aqueous fluid with aqueous gas-containing drilling fluid. Use of this lightweight, gas-containing drilling fluid comprising a mixture of water, a gas such as air, and optionally a foaming agent, results in increased penetration rates, reduced bit wear and reduced reservoir damage due to erosion by the drilling fluid as compared with air. However, the water in the drilling fluid easily invades the reservoir necessitating large quantities of fluid for make up and also can cause plugging. It would be desirable to utilize a light-weight, gas-containing drilling fluid requiring less make up and causing less damage to the reservoir due to invasion thereof as well as having improved ability to remove cuttings from the hole.

U.S. Pat. application Ser. No. 639,652 filed Dec. 11, 1975 by Fischer et al. describes a gas-containing aqueous drilling fluid for drilling subterranean reservoirs containing a geothermal fluid, which drilling fluid contains lignite as a fluid loss control additive and a salt of a high molecular weight acrylic polymer as an additive to improve wall-building and cuttings-carrying properties. While this drilling fluid has been successful in some applications, scale-forming problems can arise when drilling through reservoirs whose high temperature aqueous liquids contain scale-forming ions.

U.S. Pat. No. 3,958,635 issued May 26, 1976 to Zilch et al. describes certain substituted iminodi(methylene phosphonic acid) compounds and water-soluble salts thereof useful as scale inhibitor additives for aqueous solutions containing scale-forming ions at temperatures of 400° F. and above during production and utilization of such aqueous solutions.

U.S. patent application Ser. No. 625,814 filed Oct. 28, 1975 by Zilch et al. discloses certain amines, amides, thioamides, carboxylic acids or amide reaction products of carboxylic acids and various amines as scale inhibitor additives for the same use as discussed above.

Accordingly, a principal object of this invention is to provide a composition and method for inhibiting the formation of scale during the drilling of reservoirs containing high temperature aqueous solutions containing scale-forming ions, such as brines from oil and gas producing wells and geothermal fluids.

Another object of the invention is to provide such a composition and method for inhibiting the formation of a calcium-containing scale onto the face of the reservoir and the metal surfaces of well-drilling equipment coming in contact with such high temperature aqueous solutions.

A further object of the invention is to provide such a composition and method for inhibiting the formation of scale from liquid-containing geothermal fluids having temperatures above about 400° F.

A still further object of the invention is to provide a light-weight drilling fluid and method of use thereof for drilling a subterranean reservoir containing a geothermal fluid.

Other objects, advantages and features of the invention will become apparent from the following description and appended claims.

SUMMARY OF THE INVENTION

A composition and method of use thereof for drilling a well into a subterranean reservoir containing a high temperature aqueous liquid which contains scale-forming ions in solution or suspension. The composition comprises a gas-containing drilling fluid comprising a mixture of: (1) about 99.5 to about 90 volume percent gas and (2) about 0.5 to about 10 volume percent of an aqueous dispersion containing (a) about 327 to about 347 pounds per barrel water, (b) about 10 to about 2 pounds per barrel lignite fluid loss control additive, (c) about 2.5 to about 0.5 pounds per barrel alkali metal or ammonium salt of a high molecular weight acrylic polymer to improve wall-building and cuttings-carrying capacity, (d) about 1.0 to about 0.05 pounds per barrel organic agent that releases ammonia or a vaporous amine corrosion inhibitor and also forms a resinous residue at downhole temperature and pressure conditions which acts as an erosion inhibitor, and (e) about 0.087 to about 0.0007 pound per barrel (equivalent to 250 to 2 parts per million) of, as a scale inhibitor, a water-soluble substituted iminodi(methylene phosphonic acid) compound having a carbon-to-phosphorus bond or a water-soluble salt thereof having the formula:

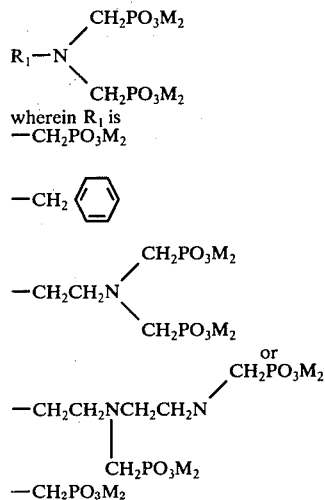

wherein $R_1$ is (i) $-CH_2PO_3M_2$ (ii) $-CH_2-\langle\bigcirc\rangle$ (iii) $-CH_2CH_2N\begin{matrix}CH_2PO_3M_2\\CH_2PO_3M_2\end{matrix}$ or (iv) $-CH_2CH_2NCH_2CH_2N\begin{matrix}CH_2PO_3M_2\\\\CH_2PO_3M_2\end{matrix}$
$\quad\quad\quad\;|$
$\quad\;\;CH_2PO_3M_2$ $-CH_2PO_3M_2$ and M is hydrogen, an alkali metal or an ammonium cation, or a water-soluble organic compound selected from the class consisting of saturated aliphatic dicarboxylic acids, lower alkyl esters or hydroxylated derivatives of saturated aliphatic dicarboxylic acids, hexamethylenetetramine, thiourea and the amide reaction products of a polycarboxylic acid and a saturated aliphatic amine, a saturated aliphatic hydroxyl amine or a heterocyclic nitrogen-containing compound; and, optionally, a foaming agent. The method comprises circulating the above-described gas-containing drilling fluid through a well during drilling operations.

DETAILED DESCRIPTION OF THE INVENTION

When gases, such as air, carbon dioxide, natural gas, nitrogen or combustion gases, are injected into an aqueous dispersion of clay circulated in a well being drilled, the resulting fluid is referred to as an "aerated drilling mud."

In drilling geothermal reservoirs, it is desirable to use a non-clay-containing drilling fluid. Clay tends to invade the relatively porous geothermal reservoirs, and causes plugging problems. In addition, a corrosion inhibitor is required in drilling fluids for geothermal reservoirs to combat the corrosive effects of free-oxygen-containing gases or carbon dioxide in aerated drilling fluid and the formation fluids. However, clay tends to adsorb these corrosion inhibitors so they are not available for their primary purpose.

Thus, there has been developed for drilling geothermal reservoirs an "aerated drilling fluid" wherein a gas is injected into a stream of water or brine circulated in a well being drilled. No clay is employed. The gas may be partially soluble in the aqueous phase but is present largely in a dispersed or entrained form as the fluid passes down the well. As the fluid passes through the drill bit and circulates out of the well, it picks up cuttings and carries them out of the well. During the circulation, the aerated drilling fluid may tend to break up and travel through the well as alternate slugs of aqueous fluid and air. If the circulation rate is maintained relatively high, cuttings are still successfully transported out of the well in spite of the separation of the component parts of the aerated drilling fluid. If a foaming agent is included in the drilling fluid injected into the well, the resulting product is referred to as a "foam drilling fluid" and comprises a dispersion of gas in the aqueous phase. If sufficient foaming agent is utilized, the drilling fluid substantially maintains its integrity during circulation through the well. It is intended that the composition and method of this invention encompass any gas-containing drilling fluid, i.e., both aerated drilling fluid and foam drilling fluid.

The most significant differences between liquid aqueous base drilling fluid and either aerated drilling fluid or foam drilling fluid is that only the former contains clay and only the latter contains air or a similar gas. Clay imparts to liquid aqueous base drilling fluid many desirable properties including higher viscosity, lower fluid loss and improved cuttings-carrying ability. However, clay also imparts some undesirable properties to the drilling fluid including partial plugging of the reservoir being drilled by the clay particles where the drilling fluid invades the reservoir. Since aerated drilling fluid and foam drilling fluid do not contain clay, it would be advantageous to provide them with the desirable rheological and fluid loss control properties of a clay-containing liquid drilling fluid without the undesirable plugging effect of the clay.

The reduced hydrostatic pressure exerted on the reservoir being drilled by a column of aerated drilling fluid or foam drilling fluid as compared to liquid drilling fluid results in reduced invasion of the reservoir by the drilling fluid. However, there exists a need for still further improved control of fluid loss. Since a large portion of aerated drilling fluid or foam drilling consists of a gas, a relatively poor material to carry cuttings out of the well, it is desired to improve this property of the drilling fluid as well.

In a foam drilling fluid the aqueous solution to be foamed usually contains about 10 to about 0.25 pounds per barrel foaming agent. The amount of foaming agent used is sufficient to maintain the foam formed sufficiently stable to be circulated through the drill string without appreciable separation. The foaming agent can be any of a wide variety of known anionic, cationic or nonionic surface active agents. Typical foaming agents are alkyl aryl sulfonates, fatty alcohol sulfates, sulfated and sulfonated amides and amines, sulfated and sulfonated esters and ethers, alkyl sulfonates, quaternary ammonium derivatives, the condensation products of a fatty material with ethylene or propylene oxide, the condensation products of phenolic compounds having lateral aliphatic groups with ethylene oxide and the like.

The foam is formed by combining the aqueous solution to be foamed and gas in a ratio so that the foam produced at downhole conditions of temperature and pressure comprises about 0.5 to about 10 volume percent aqueous solution to be foamed and about 99.5 to about 90 volume percent gas. The same ratio of aqueous solution to gas without the presence of a foaming agent can be used to form aerated drilling fluid.

For optimum drilling of geothermal reservoirs, it is necessary to further modify the above-described gas-containing drilling fluids. If air or carbon dioxide is the gas used in the drilling fluid, the resulting composition becomes more corrosive to the drill string and other metal well equipment with which it comes in contact than is liquid drilling fluid. If the gas used is methane, nitrogen or any other non-free-oxygen-containing gas, corrosion can still become a problem when drilling into geothermal fluids containing steam which is picked up and circulated along with the drilling fluid. This corrosion can be reduced by introducing into the circulating gas-containing drilling fluid stream a corrosion inhibitor, such as one that decomposes at downhole temperature and pressure conditions to release ammonia or a vaporous amine which contacts and protects the metal surfaces of well equipment exposed to the gas-containing drilling fluid. The non-volatized portion of the additive reacts or polymerizes to form a resinous residue that is deposited in part on the exposed metal surfaces and on the solid particles suspended in the drilling fluid, thereby reducing erosion and corrosion of these metal parts. Such erosion and corrosion inhibitors are described in U.S. Pat. No. 3,749,544 issued July 31, 1973 to Fischer et al.

Generally the organic compounds useful as erosion and corrosion inhibitors are tertiary amines having molecular weights above about 260, and usually above about 300. A preferred class of compounds for use in the practice of the invention are the polyamine salts of an acidic triester of a trialkanol amine, which are generally represented by the following formula:

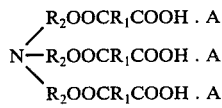

wherein $R_1$ is a bivalent hydrocarbyl radical containing about 8 to about 44 carbon atoms, $R_2$ is an alkylene radical containing about 1 to about 4 carbon atoms, and A is ammonia or a water-soluble amine containing about 1 to about 15 carbon atoms, exemplary of which are the above-described amines. In a particularly preferred embodiment $R_2$ in the above formula is ethylene. While the polyamine compounds can be generally described by the above generalized formula, it is recognized that when polydentate water-soluble amines are used to form the salt, cross-linking between two or more of the polyamine molecules may occur. Thus, when these amines are employed, the polyamine compounds may have repeating acidic triester units.

Particularly preferred polyamine salts are the morpholine, ethylenediamine, N-butylaminoethanol, trimethylamine, dimethylamine, pyridine, triethanolamine, diethylenetriamine, and diethylaminoethanol salts of an acidic triester of triethanolamine, wherein the acidic triester is obtained by esterifying triethanolamine with a long-chain dibasic acid obtained by dimerizing linoleic or isolinoleic acid.

The organic agent can be injected directly into the gas-containing drilling fluid stream, or alternatively, the agent can be mixed with a carrier liquid and this admixture injected into the drilling fluid stream. Suitable carrier liquids are water; monohydroxy aliphatic alcohols having 1 to 10 carbon atoms; aliphatic amines having 1 to 10 carbon atoms; aliphatic carboxylic acids having 1 to 10 carbon atoms; aliphatic aldehydes having 1 to 10 carbon atoms; ketones having 1 to 10 carbon atoms and mixtures thereof, especially aqueous mixtures.

In general, the organic agent is admixed with the carrier liquid in the proportion of about 0.001 to 25 weight percent of organic agent based upon the weight of the mixture, and more preferably between about 0.005 and about 10 weight percent. Erosion and corrosion of the metal parts exposed to a gas-containing drilling fluid can be substantially reduced by introducing into the drilling fluid from about 0.001 to 1 gallon of the above-described additive mixture in carrier fluid per barrel of aqueous solution to be gasified. This is equivalent to adding from 0.05 to 1.0 pounds of organic agent per barrel of aqueous solution to be gasified.

In order to control the degree of intrusion of the gas-containing drilling fluid into the reservoir, lignite is added to the drilling fluid as a fluid loss control additive. Lignite is a class IV coal as set forth in American Standards for Testing Materials (ASTM) Specification of Coals by Rank, D-388—38. Lignite is defined as a variety of coal intermediate between peat and bituminous coal, especially one in which the texture of the original wood is distinct. It is also called "brown coal" or "wood coal". The chemical characteristics and composition of lignite have been widely described in the literature, such as in the Journal of the American Chemical Society, vol. 69 (1947), and in the U.S. Bureau of Mines Information Circular 7691, parts 1 and 2, published July, 1954. In general, the term "lignite" is used herein to mean not only lignite per se, but also all naturally occurring carboniferous materials containing 10 percent or more, preferably 30 to 50 percent, of humic acid. Lignite is used in pulverized, finely particulate form. All of the lignite should pass through a 10 mesh sieve, U.S. Standard sieve series. At least 50 percent of the lignite should preferably pass through a 200 mesh sieve. Lignite is used in an amount of about 2 to about 10 pounds per barrel aqueous solution to be gasified.

In order to increase both the viscosity and the cuttings-carrying ability of the gas-containing drilling fluid, there is added thereto an alkali metal or ammonium salt of a polymer of acrylic acid, referred to as ammonium and alkali metal polyacrylates. Such polymers and their use in clay-containing liquid aqueous drilling mud are described in U.S. Pat. No. 2,552,775 issued May 15, 1951 to Fischer et al. The polymers have an average molecular weight in excess of about 2,000 which is low enough so that their ammonium and/or alkali metal salts are dispersible in aqueous media. In general, it is desirable to use those polymers whose average molecular weight is in the range of 5,000 to 50,000 and preferably in the range of 15,000 to 35,000. The salt of the polymer may be that of ammonia or any alkali metal such as sodium, potassium and/or lithium. However, the sodium salts are preferred over the other alkali metal salts and the ammonium salts.

Polymers of acrylic acid which are useful in this invention are readily prepared from the monomer by the action of heat, light, and/or catalysts. Catalysts which are particularly effective for this polymerization are the organic peroxides, such as benzoyl peroxide and cumene hydroperoxide. The properties and nature of the polymer can be varied over a considerable range by the proper choice of catalysts and/or reaction conditions. The polymer can be further modified by the addition of small amounts of copolymerization agents such as acrylonitrile, methyl acrylate, ethyl acrylate, 2-methyl propanoic acid and the like. These copolymers of acrylic acid containing up to about 10 percent by weight of the copolymerization agent are useful and operable in the application of this invention.

A particular polymer of acrylic acid which is suitable for use in this invention is prepared for example by polymerizing acrylic acid dissolved in water to form a 10 percent by weight solution of acrylic acid at a temperature of about 50° to 100° C. and using as a catalyst about 0.5 percent by weight of benzoyl peroxide based on the amount of acrylic acid present. The polymerization is controlled to give a polymer whose average molecular weight is about 25,000. The reaction is stopped by the neutralization of the reaction mixture with sodium hydroxide after which the sodium polyacrylate is isolated. Potassium, lithium and ammonium polyacrylates are prepared by neutralizing the reaction product with the appropriate hydroxides and these salts are also useful as protecting agents in this invention. Salts of polyacrylates of other molecular weights within the above range are prepared by varying the time, temperature or pressure of the polymerization reaction, the catalyst, or the concentration of the acrylic acid or catalyst, an increase in any of these variables in general tending to increase the average molecular weight of the polymer. Other modes of polymerization, employing no water, or organic solvents, or mixtures of organic solvents and water may also be employed. These are well known in the art. The polymers are used in an amount of from about 0.5 to about 2.5 pounds per barrel of aqueous solution to be gasified and/or foamed.

During the drilling of reservoirs containing high temperature aqueous liquids containing scale-forming ions with a gas-containing drilling fluid, there is often a tendency for some of the reservoir fluid to enter the well, contact and become mixed with the circulating drilling fluid. When this occurs, there is a tendency for scale to form at any one of a number of locations at the face of the reservoir and in the metal well drilling equipment which comes in contact with the circulating drilling fluid. To retard scale formation, a scale inhibitor must be mixed with the drilling fluid.

The scale-forming ions most commonly found in high temperature aqueous reservoir fluids such as geothermal fluids are the alkaline earth metal cations, such as calcium, magnesium and barium and various anions such as carbonate, bicarbonate, sulfate, phosphate, oxalate and silicate. When combinations of these anions and cations are present in concentrations which exceed the solubility of their reaction product, precipitation of solids which build up to form scale will occur.

Suitable methods of preparing one class of materials which function as scale inhibitors, water-soluble substituted iminodi(methylene phosphonic acid) compounds having a carbon-to-phosphorus bond and their salts, are well known in the art. One method of preparation involves alkylation of amines with chloroacetic acid to yield imino acetic acids and following substitution of carboxylic acid groups for phosphonic acid groups by treating with phosphorous acid.

Particularly effective scale inhibitors are: nitrilo tri(methylene phosphonic acid)

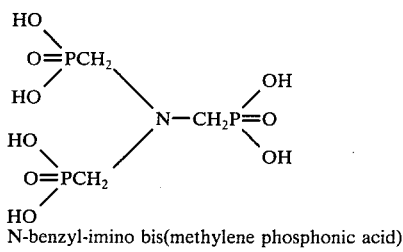

N-benzyl-imino bis(methylene phosphonic acid)

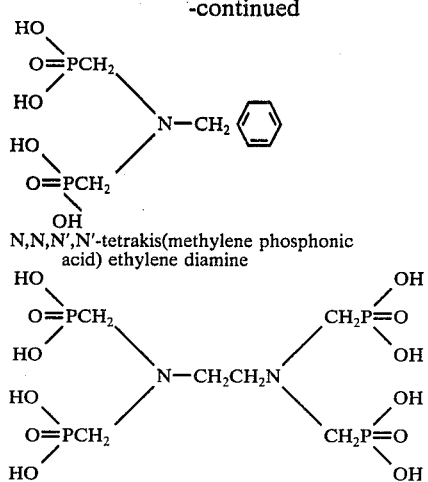

N,N,N',N'-tetrakis(methylene phosphonic acid) ethylene diamine and alkali metal or ammonium salts thereof. While the acid form of the above compounds can be employed, it is preferred to at least partially neutralize them by the addition of ammonia or aqueous solutions of alkali metal or ammonium hydroxide. It is recommended to adjust the pH of these compounds to a value of at least about 5.3.

Water-soluble organic compounds which function as scale inhibitors in high temperature geothermal and brine-producing wells include various dicarboxylic acids and derivatives thereof. Saturated aliphatic dicarboxylic acids having about 2 to about 10 carbon atoms may be used. Such acids include oxalic, malonic, succinic, glutaric, adipic suberic and sebacic. Hydroxy-substituted saturated aliphatic dicarboxylic acids, such as tartaric acid can also be used. Likewise, lower alkyl esters of dicarboxylic acids, such as dimethylsuccinate, function as scale inhibitors.

Further scale inhibitors are hexamethylenetetramine, thiourea, and the amide reaction products of polycarboxylic acids and various nitrogen-containing organic compounds. The polycarboxylic acids can be the same dicarboxylic acids and hydroxy-substituted dicarboxylic acids described above as well as saturated aliphatic tricarboxylic acids, such as citric acid. The nitrogen-containing organic compounds with which the polycarboxylic acid can be reacted are: (1) primary and secondary saturated aliphatic amines having about 2 to about 8 carbon atoms, such as ethylamine, butylamine, hexylamine, cyclohexylamine, heptylamine, octylamine, di-n-butylamine, di-n-propylamine, propane-(1,3)-diamine, 3-dimethylaminopropylamine, and 3-diethylaminopropylamine; (2) saturated aliphatic hydroxyl amines containing about 2 to about 10 carbon atoms, such as monoethanolamine, diethanolamine and aminoethanolamine; and (3) 5- or 6-member ring saturated heterocyclic compounds containing, in part, either nitrogen or both nitrogen and oxygen, such as piperidine, pyyrolidine, piperazine, morpholine and 2,6-dimethylmorpholine.

The amides are prepared according to well known techniques by reacting 1 mol polycarboxylic acid with a number of mols primary or secondary amine, hydroxylated amine or other nitrogen-containing compound equal to the number of carboxylic groups in the polycarboxylic acid. Thus, for a dicarboxylic acid, 1 mol acid is reacted with 2 mols amine. Often about a 0.5 mol excess of amine is used to insure that the reaction goes to completion. The reaction is carried out in an inert organic solvent. For example, 59 grams (0.5 mol) succinic acid is dissolved in 400 milliliters dioxane solvent and heated to 214° F., the boiling point of dioxane. To this solution is added dropwise with stirring, 128 grams (1.5 mols) piperidine dissolved in 250 milliliters dioxane. The temperature of the exothermic reaction is held at 214° F. After all of the piperidine solution has been added, the reaction is stirred for an additional 30 minutes, cooled and the precipitated reaction product, the dipiperidine amide of succinic acid, filtered off and recrystallized from methanol/ethylacetate. The product yield is 69 grams.

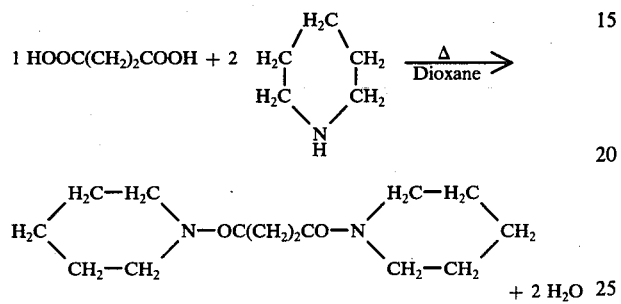

The inhibitor can be added in concentrated form to the drilling fluid or it can be utilized in the form of an aqueous solution. Where concentrations of inhibitor required are small, dilution of 1 barrel of inhibitor with 50 or more barrels of fresh water forms an inhibitor-containing solution which may be added readily to scale-forming compositions.

The concentrations of scale inhibitor required depends to a large extent on the concentration of scale-forming ions in the aqueous solution to be treated and the severity of change of conditions in the said aqueous solution during its production and subsequent utilization. Generally, 0.087 to about 0.0007 pound per barrel (equivalent to 250 to 2 parts per million) inhibitor added to the aqueous dispersion component of the drilling fluid gives satisfactory inhibition of scale deposition, i.e., serves as a scale-inhibiting amount of inhibitor.

In utilizing foam drilling fluid, the gas, foaming agent and other additives may be dispersed in the aqueous phase at the surface prior to injection into the well and agitated to form a foam. However, it is generally preferred to inject the gas, foaming agent and other additives into the stream of water or brine circulated into the well being drilled so as to form the foam as the fluids pass down the well. In utilizing aerated drilling fluid, the gas and other additives are injected into the stream of water or brine being circulated into the well.

The invention is further described by the following example which is illustrative of a specific mode of practicing the invention and is not intended as limiting the scope of the invention defined by the appended claims.

EXAMPLE

The effectiveness of the composition and method of this invention in drilling a subterranean reservoir containing a geothermal reservoir is demonstrated by the following test. A well is drilled from the surface to a depth of about 100 feet above the geothermal reservoir using a rotary bit and conventional clay-containing drilling mud. It is known from previous wells drilled in the area that the geothermal liquid contained in the reservoir contains scale-forming calcium and magnesium ions. In previous wells drilled into the geothermal reservoir using conventional gas-containing drilling fluid, the geothermal liquid has contacted and become mixed with the drilling fluid resulting in scale build up on the face of the reservoir, as indicated by the low permeability of the reservoir following completion of the well, and scale build up in the well drilling equipment, as indicated by difficulty in circulating the drilling fluid during the drilling operation. Drilling of the instant well is continued while injecting down the drill string 1,000 cubic feet per minute of air and 150 gallons per minute of an aqueous solution containing: 0.4 pound per barrel of an erosion and corrosion inhibitor prepared by first mixing together 75 weight percent water, 10 weight percent diethylene triamine and 15 weight percent of an acidic triester prepared by the condensation of triethanolamine and dimerized linoleic acid and then diluting with additional water in the proportion of about 30 gallons of inhibitor to each 10 barrels of water; 3 pounds per barrel lignite; 1 pound per barrel of the sodium salt of an acrylic acid polymer having an average molecular weight of around 25,000; 0.00009 pound per barrel of the ammonium salt of N,N,N',N'-tetrakis(-methylene phosphonic acid) ethylene diamine neutralized to a pH of 7.5 with ammonium hydroxide; and the remainder water. The well is drilled through the geothermal reservoir and completed in the usual manner. During the drilling of this well no difficulty in circulating the drilling fluid is experienced indicating that no significant amount of scale is present in the drilling equipment. When the well is put on production the relatively high production rate of geothermal liquid indicates that there is no appreciable build up of scale on the formation face.

While particular embodiments of the invention have been described, it will be understood, of course, that the invention is not limited thereto since many modifications can be made and it is intended to include within the invention such modifications as are within the scope of these claims.

The invention having thus been described, we claim:

1. A gas-containing aqueous drilling fluid comprising about 99.5 to about 90 volume percent of a gas and from about 0.5 to about 10 volume percent of a clay-free aqueous dispersion containing (1) about 327 to about 347 pounds per barrel water, (2) about 10 to about 2 pounds per barrel lignite, (3) about 2.5 to about 0.5 pounds per barrel alkali metal or ammonium salt of a homopolymer of acrylic acid or a copolymer containing at least about 90 percent by weight acrylic acid and up to about 10 percent by weight acrylonitrile, methyl acrylate, ethyl acrylate or 2-methyl propanoic acid, which homopolymers and copolymers have an average molecular weight of 5,000 to 50,000, (4) about 1.0 to about 0.05 pounds per barrel of a polyamine salt having the formula:

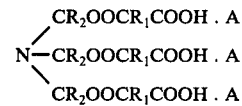

where $R_1$ is a bivalent hydrocarbyl radical containing about 8 to about 44 carbon atoms, $R_2$ is an alkylene containing about 1 to about 4 carbon atoms and A is ammonia or a water-soluble amine containing about 1 to 15 carbon atoms, and (5) about 0.087 to about 0.0007 pound per barrel of a scale inhibitor comprising a water-soluble organic compound selected from the group consisting of: (i) unsubstituted saturated dicarboxylic acids having about 2 to about 10 carbon atoms, (ii) dimethylsuccinate, (iii) thiourea, (iv) hexamethylenetetramine and (v) the amide reaction products of unsubstituted saturated aliphatic polycarboxylic acids containing about 2 to about 10 carbon atoms, tartaric acid, or dimethylsuccinate with saturated aliphatic primary and secondary amines having from about 2 to about 8 carbon atoms, their hydroxylated derivatives selected from the group consisting of monoethanolamine, diethanolamine and aminoethanolamine or saturated nitrogen-containing heterocyclic compounds selected from the group consisting of piperidine, pyrrolidine, piperazine, morpholine and 2,6-dimethylmorpholine.

2. The composition defined in claim 1 wherein the aqueous dispersion also contains about 10 to about 0.25 pounds per barrel of a foaming agent.

3. The composition defined in claim 2 wherein the foaming agent is an anionic, cationic or nonionic surface active agent.

4. The composition defined in claim 1 wherein the gas is air.

5. The composition defined in claim 1 wherein the dicarboxylic acid scale inhibitor is succinic acid.

6. In the method of drilling a well into a subterranean reservoir containing a high temperature aqueous liquid wherein a drilling fluid is passed through the well in contact with the subterranean reservoir during the drilling operation, the improvement which comprises employing as the drilling fluid a composition comprising about 99.5 to about 90 volume percent of a gas and from about 0.5 to about 10 volume percent of a clay-free aqueous dispersion containing (1) about 327 to about 347 pounds per barrel water, (2) about 10 to about 2 pounds per barrel lignite, (3) about 2.5 to about 0.5 pounds per barrel alkali metal or ammonium salt of a homopolymer of acrylic acid or a copolymer containing at least about 90 percent by weight acrylic acid and up to about 10 percent by weight acrylonitrile, methyl acrylate, ethyl acrylate or 2-methyl propanoic acid, which homopolymers and copolymers have an average molecular weight of 5,000 to 50,000, (4) about 1.0 to about 0.05 pounds per barrel of a polyamine salt having the formula:

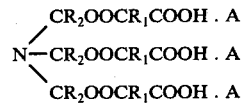

where $R_1$ is a bivalent hydrocarbyl radical containing about 8 to about 44 carbon atoms, $R_2$ is an alkylene containing about 1 to about 4 carbon atoms and A is ammonia or a water-soluble amine containing about 1 to 15 carbon atoms, and (5) about 0.087 to about 0.0007 pound per barrel of a scale inhibitor comprising a water-soluble organic compound selected from the group consisting of: (i) unsubstituted saturated dicarboxylic acids having about 2 to about 10 carbon atoms, (ii) dimethylsuccinate, (iii) thiourea, (iv) hexamethylenetetramine and (v) the amide reaction products of unsubstituted saturated aliphatic polycarboxylic acids containing about 2 to about 10 carbon atoms, tartaric acid, or dimethylsuccinate with saturated aliphatic primary and secondary amines having from about 2 to about 8 carbon atoms, their hydroxylated derivatives selected from the group consisting of monoethanolamine, diethanolamine and aminoethanolamine or saturated nitrogen-containing heterocyclic compounds selected from the group consisting of piperidine, pyrrolidine, piperazine, morpholine and 2,6-dimethylmorpholine.

7. The method defined in claim 6 wherein the gas is air.

8. The method defined in claim 6 wherein the dicarboxylic acid scale inhibitor is succinic acid.

9. The method defined in claim 6 wherein the high temperature aqueous liquid is a geothermal fluid.

10. The method defined in claim 6 wherein the high temperature aqueous fluid is a brine.

11. The method defined in claim 6 wherein the aqueous dispersion also contains about 10 to about 0.25 pounds per barrel of a foaming agent.

12. The method defined in claim 11 wherein the foaming agent is an anionic, cationic or nonionic surface active agent.

* * * * *